Patented June 22, 1943

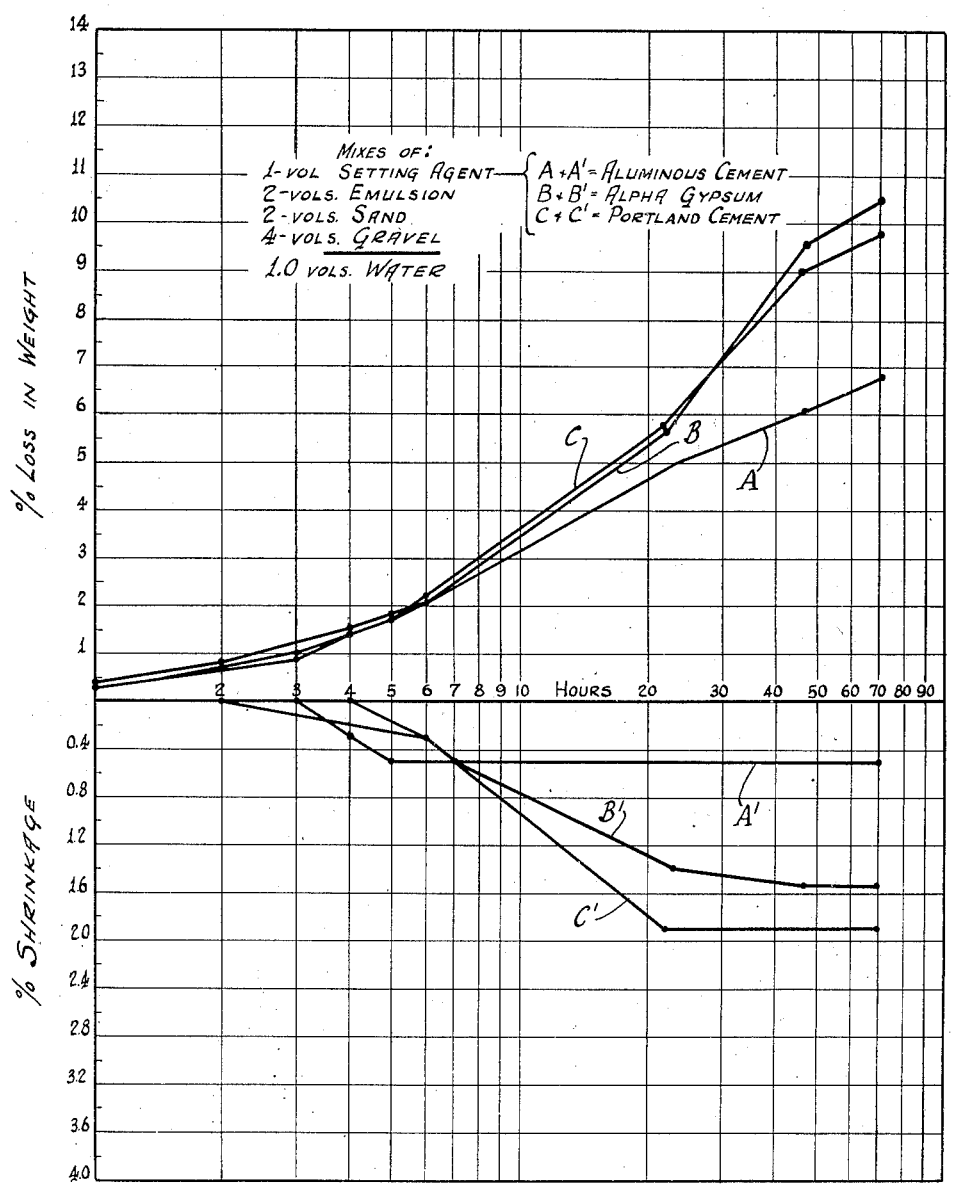

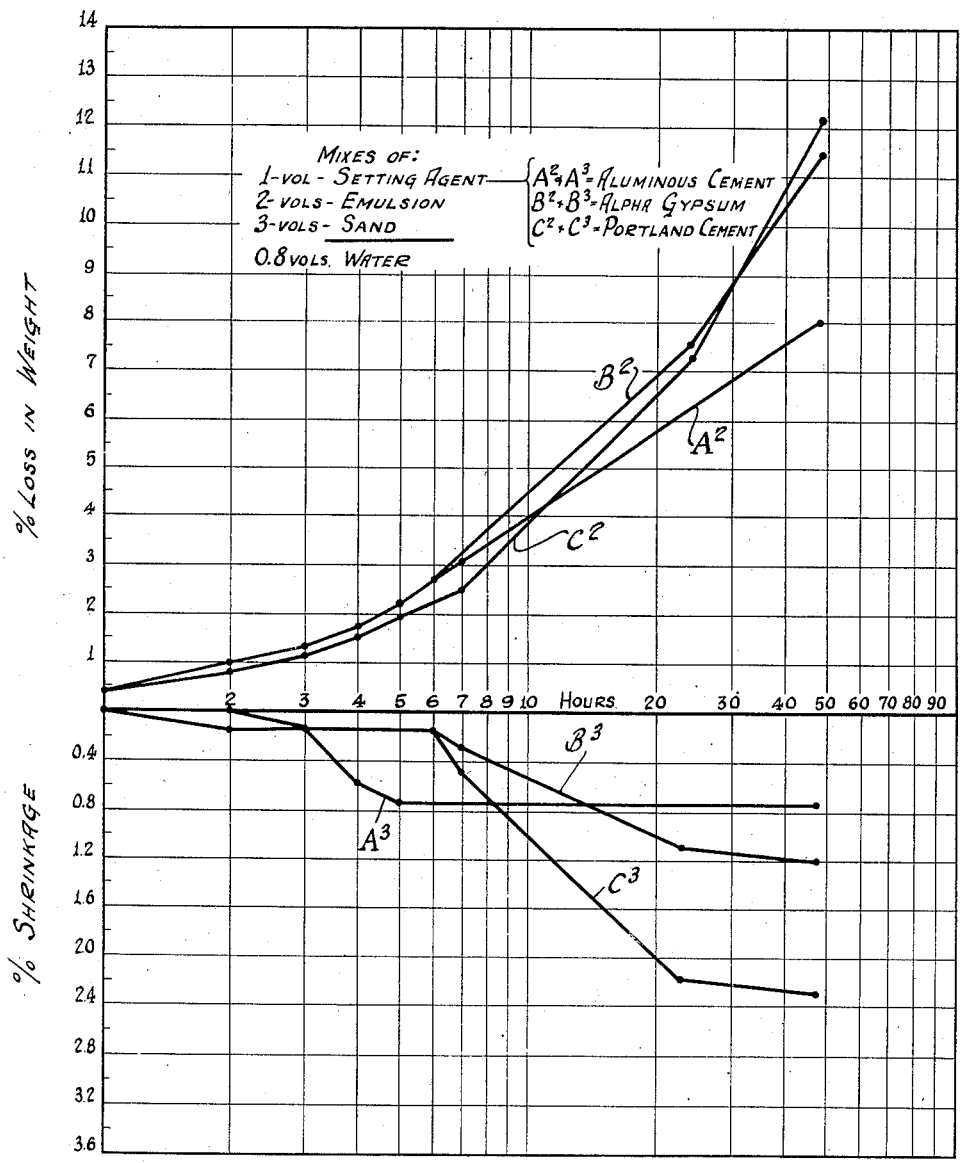

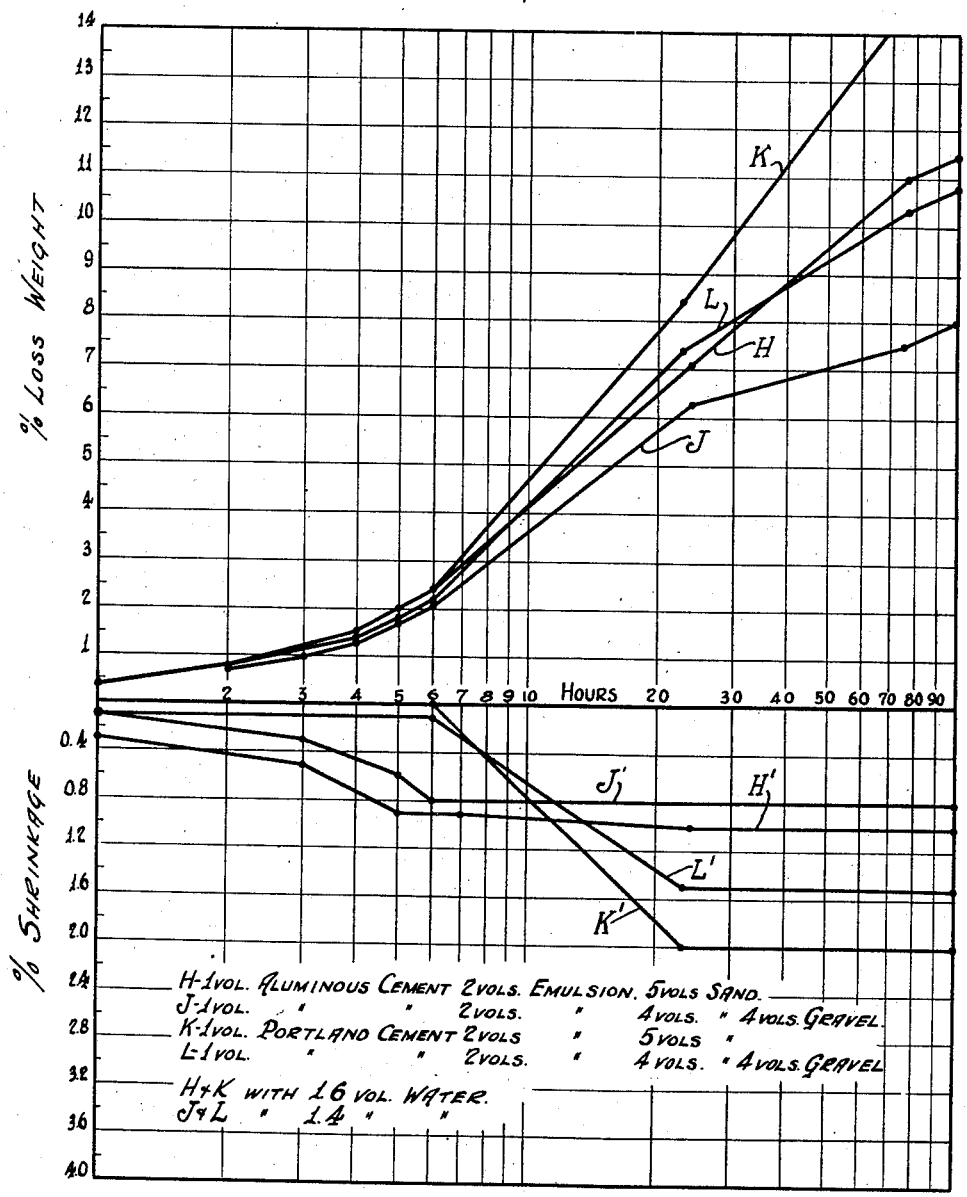

2,322,641

UNITED STATES PATENT OFFICE 2,322,641

MASTIC COMPOSITION FOR FLOORING, ETC.

Frank P. Jaros, New York, N. Y., assignor, by mesne assignments, to The Patent and Licensing Corporation, New York, N. Y., a corporation of Massachusetts Application April 4, 1939, Serial No. 265,912

9 Claims. (Cl. 106—104)

This invention relates to compositions adapted for use in the production of floorings and the like, and is more particularly concerned with improvements in the production of mastic floorings of bituminous composition. More specifically, the invention is concerned with compositions of this type wherein the mastic qualities are derived from the use of aqueous emulsions of asphalt or other bitumen.

Mastic flooring compositions, for use in the production of industrial floors and to some extent also for the production of underlayments for leveling up concrete or wood sub-floors (before applying floor covering material such as asphalt tile, rubber tile and linoleum) have heretofore been made from mixtures of asphalt emulsion, Portland cement and aggregates such as sand and gravel. These compositions, however, have not been altogether satisfactory in use, the two principal disadvantages thereof being, first, that the setting time of the compositions was such as to preclude the opening of the floor to use prior to several days after it is laid and, secondly, that they exhibit a tendency to shrink and crack during setting and drying. The slow setting of these compositions (12 to 24 hours) precludes proper finishing of the work in the usual 7 or 8 hour working day and necessitates leaving the work in a rough finish. Moreover, if sufficient water is included in the mix to give it easy workability, there accumulates on the surface a layer of water which remains for from 8 to 20 hours (depending upon atmospheric conditions). Likewise, in these compositions, fine material, including Portland cement, floats to the surface as the water is exuded from the mass, resulting frequently in a dirty grayish colored surface appearance of the finished floor.

To overcome these objections in the use of Portland cement as the setting agent in mastic compositions of the character described, it has been proposed to utilize, in lieu of the Portland cement, other setting agents such as calcined gypsum, including so-called alpha gypsum, as disclosed in patent to Linzell 1,901,055. Although mastic compositions made with the so-called alpha gypsum set more quickly than do comparable compositions made with Portland cement, they do not always produce floorings that are free from shrinkage and cracking. They are objectionable also in that they are often adversely affected by contact with water (a condition often prevailing with industrial floors) because of the solvent action of the water upon the calcium sulphate, especially in those floors made from mixes utilizing this setting agent in the proportions required to render the flooring substantially free of the tendency to crack and to impart relatively high adequate load carrying capacity.

According to my invention, I provide mastic flooring compositions which are substantially free of any tendency to shrink and crack, and which in other respects are superior to mastic flooring compositions wherein Portland cement, gypsum, Keenes' cement, alpha gypsum and other setting agents have been used.

My invention, briefly stated, consists in using as mastic flooring composition, mixtures of aqueous emulsions of bitumen such as asphalt, with suitable proportions of sand or other aggregate, and a setting agent comprising a hydraulic cement of the type composed largely of calcium aluminates. These cements are generally termed aluminous cements and will be so referred to herein. The material known as "Lumnite" is typical of the aluminous cements which can be used according to the invention.

I have discovered that aluminous cements when used in compositions of this character result in the production of mastic compositions which show little or no tendency to shrink, this tendency being very little affected by variations, over a wide range, in the relative amounts of asphalt, water and aggregate in the composition. Aluminous cement when used in these compositions is superior to Portland cement, alpha gypsum and similar setting agents, apparently because of its ability to combine with larger proportions of the water, thus leaving less free water to be eliminated from the composition by evaporation, and because the setting time of these compositions when made with aluminous cement is comparatively low and very little affected by changes in the proportion of the aggregate, water and asphalt or other bituminous binder composing the mix. Compositions made in accordance with the invention become sufficiently set for troweling in four hours or less, are ready for light traffic in from 8 to 12 hours after placement, and are free of shrinkage and cracking under all practical conditions even when a relatively large excess of water is used to produce easy workability of the mix. The more rapid setting of the compositions made with aluminous cement and the reduction in the amount of water eliminated prior to the setting appear to be the principal factors accounting for the superiority of floorings made therewith. In compositions according to the invention, a black asphaltic film is formed on the surface thereby giving the finished floor a desirable black finish surface appearance which, when scuffed, becomes shiny rather than sandy as in the case of mastic compositions heretofore used.

Although aluminous cement is not per se a fast setting cement and has about the same initial and final setting time as Portland cement, nevertheless in mixtures containing asphalt emulsions, the mixtures made with aluminous cements will attain rigidity much sooner than those made with comparable amounts of Portland cement. Another advantage resulting from the use of aluminous cements as the setting agent in mastic compositions of the kind herein dealt with is that it permits accurate control of the setting time. Thus, by the addition of accelerators, the time at which the composition may be set sufficiently to enable it to be troweled can be reduced from four hours to one hour under normal atmospheric conditions, and in fact, under certain conditions, virtually a flash set can be produced. As accelerators of the setting time, use may be made of such salts as magnesium silico fluoride. This material when used in quantities approximating 2% by weight of the cement content of the mass is capable of accelerating the set so that under average conditions the mixture can be troweled in one hour. Other salts such as acid sulfates likewise are effective as accelerators of the setting time of the mastic compositions made with aluminous cement. Similarly, the setting time can be retarded by the use of chlorides such as magnesium chloride where the working conditions are such as to require retardation of the setting time.

The general properties of compositions made in accordance with my invention and their advantages over similar compositions made with setting agents such as Portland cement and alpha gypsum will be more apparent from the detailed description to follow and from a study of the accompanying drawings. The drawings are graphs showing the results of tests made on mastic compositions utilizing aluminous cement as the setting agent, and on comparable mixtures made with Portland cement and with alpha gypsum as setting agents.

In all of the graphs shown in the accompanying drawings, the time is plotted in hours on a logarithmic scale. On the upper half of each graph, the percent loss in weight as a function of time is plotted; on the lower half, the percent shrinkage as a function of time is plotted.

In these drawings:

Figs. 1 and 1ª show the rate of water loss and shrinkage for typical flooring compositions made in accordance with the invention and for comparable compositions using Portland cement and alpha gypsum, in lieu of the aluminous cement, as the setting agent.

Fig. 3 is a graph showing these data for several compositions utilizing aluminous cement in accordance with the invention, in proportions particularly adapting the composition for use as an underlayment for flooring, and for two comparable compositions wherein Portland cement is employed as the setting agent.

Figure 2:
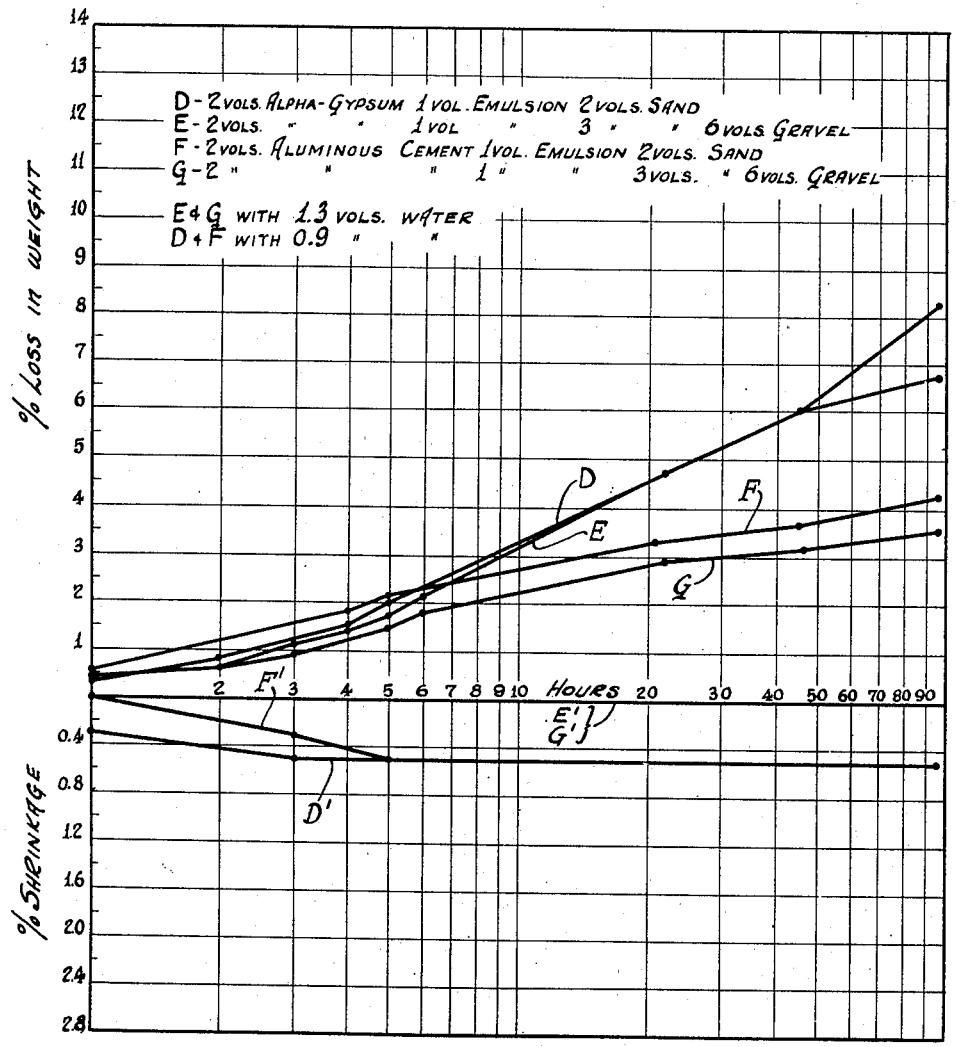
Fig. 2 is a graph showing these data for two typical compositions made with alpha gypsum as the setting agent, in proportions in which this setting agent is usually employed, and for two comparable compositions utilizing aluminous cement in lieu of the alpha gypsum, as the setting agent.

Experience in the use of mastic flooring compositions that exhibit a tendency to develop cracks when laid, indicates that the cracking is caused by the linear shrinkage of the composition. This shrinkage is due to loss of water from the mix by evaporation or by its absorption into the base over which the flooring is applied, where that loss occurs to a substantial extent during the period in which the composition has not set to a sufficiently rigid condition to enable it to resist the contractive forces brought about by a decrease in its volume. Evaporation or other loss of water from the composition after the cement has set will proceed with little, if any, change in the volume, if the strength or cohesion of the mixture is sufficiently high. That is to say, the shrinkage that is responsible for the development of cracking in the composition is shrinkage that must take place largely prior to the time that the cement has set sufficiently to make the flooring rigid. Thus, the cracking that develops in mastic floors made with Portland cement is due to the relatively slow rate at which the Portland cement sets to a sufficiently rigid state to resist the contractive forces caused by the loss of water during the early period of setting and prior to the time that the composition attains the rigidity necessary to halt further reduction in volume upon continued elimination of water. The extent of the cracking that is developed is generally the greater according as the loss of water (i. e., reduction in volume) is greater in the period before the cement has set to a sufficient extent.

In general, it may be stated that mastic mixtures of the type here dealt with which do not shrink will not crack; mixtures which have a shrinkage of ½% or less will ordinarily not crack and will be satisfactory in service; mixtures that shrink more than ½% but less than about 1% may develop hairline cracks which, under certain conditions of use, are not objectionable. On the other hand, mixtures that shrink over 1% will usually exhibit objectionable amounts of cracking and be unsatisfactory in service.

Mastic compositions made with aluminous cement, used in proportions varying over a wide range show shrinkage of less than 1% and hence are free of any tendency to crack.

In making the compositions of my invention, the asphalt or other bitumen that imparts the mastic quanlities to the composition and serves as the ultimate binder in the composition to maintain its coherency after the crystalline or cementitious structure of the setting agent is broken down, is employed in the form of an emulsion in water. The emulsion may be any of the commercially available types so long as it possesses a stability sufficient to prevent it from being broken when it is mixed with the setting agent and with the aggregate. Typical of asphalt emulsions that may be used for this purpose are those made in accordance with Kirschbraun Patent 1,733,496. The asphalt or other bitumen will usually have a melting point of from 100–180° F. and a penetration between 30 and 100 at 77° F. The bitumen content of the emulsion may vary from 50 to 70%, the bentonite or other dispersing agent from 2 to 5%, and the water content from about 32 to 50%, all by weight. In lieu of emulsions made with bentonite or other mineral colloids as emulsifying agent, emulsions of the soap or casein types may be employed if they are made sufficiently stable to resist breaking of the emulsion by the electrolytes present in the cement.

The aluminous cement may be mixed with the aggregate at the time of use and the proper amount of bitumen emulsion may then be added and mixed thoroughly with the mixture of setting agent and aggregate. Alternatively, the setting agent and the aggregate may be mixed dry and shipped as a mixture to the job where the required amount of the emulsion and water is mixed therewith. In either case, water in an amount sufficient to bring the mixture to the desired troweling or spreading consistency may be added to the mixture of the setting agent and the aggregate.

A typical mixture made in accordance with my invention suitable for use as a mastic flooring for industrial purposes comprises the following:

|  | Parts by volume | Weight, pounds | |
|---|---|---|---|
|  |  | Water | Solids |
| Aluminous cement | 1 |  | 94 |
| Asphalt emulsion (60% asphalt; 38% water) | 2 | 48 | 76 |
| Sand | 2 |  | 200 |
| Gravel | 4 |  | 400 |
| Additional gaging water | 1 | 62.4 |  |

In the above tabulation (as also in the embodiments and comparative formulae hereinafter set forth) the weights of the several ingredients are calculated on the basis of 94 lbs. as the weight of one cubic foot of the setting agent, 62 lbs. as the weight of one cubic foot of emulsion, and 100 lbs. as the weight of one cubic foot of sand and also of gravel. Based on an emulsion of 38% water content, the composition according to the above tabulation contains about 14.3 parts water to 100 parts of solids, or approximately 12.5% by weight of water in the total composition.

In Fig. 1 of the drawings, the curve designated A shows percent loss in weight (calculated from the original weight of the mixture) of this composition and the curve A' shows the percent shrinkage of this composition when spread in a layer of about ½ inch thickness, as is average for mastic floorings. As will be noted from Fig. 1, the composition suffered a shrinkage of about ½%, this maximum having been reached at the fifth hour after the material was laid, and before it lost more than about 1.75% of its original weight. Since the loss in weight is represented entirely by elimination of water, this means that at the end of the fifth hour this composition had set to a sufficiently rigid state to resist further shrinkage while it retained approximately 87% (11.0% out of 12.5%) of its original water content.

In the same figure are shown the results obtained with compositions utilizing alpha gypsum as the setting agent in one case and Portland cement as the setting agent in the other case, these setting agents being used, in each instance, in the same volume proportions with the same emulsion, sand, gravel and additional gaging water as in the composition represented by the above formula. In both instances, also, the composition was spread and dried under the same conditions of temperature and humidity as was that composition. In the lower half of this figure, curve B' shows the percent of shrinkage in the case of the composition with alpha gypsum. As will be noted, the shrinkage continued over a period of at least thirty hours, reaching a maximum of nearly 1.5% at about thirty hours. As will be seen from curve B showing the rate of loss in weight of this composition, over 6.5% of its weight, i. e., over 50% of its original 12.5% water content had been eliminated from the composition before it had set sufficiently to cease shrinking. In the case of the composition made with Portland cement, as indicated by curve C', this continued to shrink over a period of approximately twenty hours, reaching its maximum shrink of 1.9% by the twenty-second hour, at which time, as indicated by curve C, it had already lost 5.5% of its original weight, or approximately 44% of its original water content.

As will be noted by a comparison of the curves of Fig. 1, the composition of my invention as represented by curves A and A' not only sets up sufficiently to give a rigid structure more quickly than either of the other two, but it reaches that condition before loss of much less of its original water content than is lost by either of the other two before they attain their set condition. Furthermore, as will be noted from the upper half of Fig. 1, the total loss of water in the composition made in accordance with my invention, as represented by curve A, is less than in either of the other two compositions represented by curves B and C. This means that the aluminous cement combines with more water than does either the Portland cement or the alpha gypsum and hence leaves less of the original water to be evaporated or otherwise removed. This reduction in the amount of water to be removed, as by evaporation, also contributes to the reduction in the tendency towards shrinkage and cracking.

Substantially similar results and advantages are depicted in Fig. 1$^a$ wherein curves A$^2$ and A$^3$ represent respectively percent loss in weight and the shrinkage of another composition embodying the invention utilizing one volume of aluminous cement, two volumes of asphalt emulsion and three volumes of sand, with 0.8 volume additional gaging water. The emulsion being of about 38% water content, this composition contained about 20.6 parts water to 100 parts solids or 16.6% water. Curves B$^2$ and B$^3$ in this figure show the percent loss in weight and the shrinkage for a comparable composition made with alpha gypsum in the same volume proportions of asphalt emulsion, sand and additional gaging water, and curves C$^2$ and C$^3$ show these data for a comparable composition made with Portland cement.

For the purpose of contrasting the compositions depicted in Figs. 1 and 1$^a$ with compositions wherein alpha gypsum is used as the setting agent, I have plotted in Fig. 2 of the drawings the percent loss in weight and the percent shrinkage with respect to two flooring mixtures utilizing alpha gypsum in proportions in which this setting agent is normally used in making mastic floorings, and with respect to comparable mixtures wherein aluminous cement is used as the setting agent. The compositions of these four mixtures, all figures being given as parts by volume, were as follows:

|  | Mixture D | Mixture F |
|---|---|---|
| Setting agent | [1] 2 | [2] 2 |
| Asphalt emulsion (60% asphalt; 38% water) | 1 | 1 |
| Sand | 2 | 2 |
| Additional gaging water | 0.9 | 0.9 |

|  | Mixture E | Mixture G |
|---|---|---|
| Setting agent | [1] 2 | [2] 2 |
| Asphalt emulsion (60% asphalt; 38% water) | 1 | 1 |
| Sand | 3 | 3 |
| Gravel | 6 | 6 |
| Additional gaging water | 1.3 | 1.3 |

[1] Alpha gypsum.
[2] Aluminous cement.

With asphalt emulsion of the water content indicated, mixtures D and F thus contained approximately 18.5 parts water to 100 parts solids, or 15.5%, by weight, of water; and mixtures E and G contained about 9 parts water to 100 parts solids, or 8.5%, by weight, of water. These four mixtures were allowed to set and dry under substantially identical conditions. In Fig. 2 the curves designated by the letters D, E, F, and G show the percent loss in weight, and those designated by these letters primed, show the percent shrinkage for the mixtures designated D, E, F and G, respectively, in the above tabulation. It will be noted that whereas shrinkage curves E' and G' for mixtures E and G show zero shrinkage for both of these compositions and the shrinkage curves D' and F' for mixtures D and F show a maximum shrinkage of 0.5% for both the latter compositions, nevertheless the percent loss in weight after the compositions have set sufficiently to produce no further shrinkage is less in the case of the compositions made with the aluminous cement (curves F and G) than in the case of the other two compositions made with alpha gypsum as the setting agent (curves D and E). Although the shrinkage as shown by the curves of Fig. 2 is within tolerable limits, as compared with shrinkage of the composition represented by curves B' and B³ on Figs. 1 and 1ᵃ, it may be pointed out that in compositions of the kind represented by the curves of Fig. 2, the ratio of the setting agent to asphalt is comparatively high and produces a finished flooring which does not possess the degree of masticity obtainable when using the setting agent in the proportions prevailing in compositions as represented by the curves on Figs. 1 and 1ᵃ. Thus, whereas the compositions represented by the curves of Figs. 1 and 1ᵃ contain 1 part by volume of the setting agent to 2 parts by volume of asphalt emulsion (or about 1 part of setting agent to 0.8 part asphalt by dry weight), compositions D, E, F and G above, contain 2 parts by volume of the setting agent to 1 part by volume of asphalt emulsion (or nearly 5 parts setting agent to 1 part asphalt by dry weight). Compositions containing these relatively higher ratios of the setting agent to asphalt produce floorings that are of a hardness and brittleness such that they partake more of the nature of the setting agent than of the asphalt binder and moreover, because of the higher proportions of the setting agent, are more costly. For these reasons the compositions made with relatively high ratios of setting agent to asphalt are generally not as desirable for the production of mastic floors as are the compositions wherein the setting agent is used in amounts not more than twice the amount of the asphalt, by dry weight of solids. The setting agent must, however, be present in an amount at least sufficient, depending upon the nature and amount of aggregate, to furnish the necessary setting effect. Generally speaking, therefore, my invention will find its greatest usefulness in connection with those mixtures wherein the ratio by volume of setting agent to asphalt emulsion lies within the range of from about 1:1.25 to 1:4. In terms of dry weight of solids, this range is equivalent to a setting agent—asphalt ratio of from about 1:0.5 to 1:1.6.

In Fig. 3 of the drawings, I have shown the curves representing the percent loss in weight and percent of shrinkage for two additional flooring mixtures embodying my invention in comparison with comparable mixtures wherein Portland cement is employed as the setting agent. One of these compositions, herein designated by the letter H, comprised the following in parts by volume:

| | |
|---|---|
| Aluminous cement | 1 |
| Asphalt emulsion (60% asphalt; 38% water) | 2 |
| Sand | 5 |
| Additional gaging water | 1.6 |

The other of said compositions, designated herein by the letter J, comprised the following in parts by volume:

| | |
|---|---|
| Aluminous cement | 1 |
| Asphalt emulsion (60% asphalt; 38% water) | 2 |
| Sand | 4 |
| Gravel | 4 |
| Additional gaging water | 1.4 |

The mixture comparable to mixture H but using Portland cement in lieu of the aluminous cement is herein designated by the letter K, and the mixture comparable to mixture J but using Portland cement in lieu of the aluminous cement, is herein designated by the letter L. With emulsion of the water content indicated and with the additional volumes of gaging water above given, mixture H and its comparable mixture K contained approximately 22 parts of water to 100 parts solid or 17.9% by weight of water and mixture J and its comparable mixture L contained 14 parts water to 100 parts solids or approximately 12.3% by weight of water. The proportions of the ingredients in the four last-named compositions are such as to adapt them particularly for use as underlayments for floor covering materials, or for leveling up old concrete or wood floors. Thus, these compositions, in general, have a higher sand content than the compositions previously referred to, in order to enable them to be placed and troweled to a very smooth level surface and to avoid unevenness due to particles of gravel which, if they crop upon the surface, would cause markings to appear through the tile or other flooring material laid thereover.

It will be noted from the curves of Fig. 3 that as contrasted with mixture H embodying my invention, which at the end of five hours attained a rigidity sufficient to resist shrinkage upon further loss of water, the comparable mixture K, made with Portland cement as the setting agent, had attained that degree of rigidity by the end of about twenty-three hours. Likewise, comparing curves J and L, it will be noted that whereas composition J embodying my invention attained rigidity sufficient at the end of six hours to resist further shrinkage upon further elimination of water therefrom, the comparable mixture L, made with Portland cement as the setting agent, again had reached that degree of rigidity by the end of about twenty-three hours. Noteworthy also from the curves of Fig. 3 depicting these four compositions is the fact that whereas both mixtures H and J had lost only approximately 2% in weight, that is to say, 11% and 16% of their original water content, respectively, at the time they attained the rigidity referred to, the comparable mixtures K and L had lost, respectively, about 8.4% and 6.8% of their weight or 47% and 55% of their original water content. Again, it will be observed from the upper half of Fig. 3 that from the standpoint of total amount of water eliminated from these compositions, those made with aluminous cement as the setting agent (curves H and J), at the end of 100 hours drying, lost less weight, i. e., less water, than the comparable mixtures made with Portland cement (curves K, L respectively), thus showing that aluminous cement used as the setting agent in accordance with the invention combines with more of the water in the mixture than does Portland cement.

It will be noted by comparison of the curves in the lower half of Figs. 1 and 1ᵃ with those in the lower half of Figs. 2 and 3, that whereas in the case of the compositions made with aluminous cement the setting time, as represented by the leveling off or break in the curve, is in all cases about the same, namely, of the order of five or six hours, this is not the case with the compositions wherein the alpha gypsum is used as the setting agent. In the latter case, the setting time of the compositions made with the higher proportions of the gypsum (Fig. 2) is five hours or less, whereas the setting time of compositions made with the smaller proportions of gypsum (Figs. 1 and 1ᵃ) extends over a period in excess of twenty hours. In other words, these curves aptly depict the fact that these compositions, when utilizing aluminous cement as the setting agent, are very little affected as to their setting time and shrinkage by changes in the amount of aggregate, water or asphalt, whereas such is not the case with the compositions that are made with the alpha gypsum as the setting agent. Likewise, comparison of the curves shows that under normal average drying conditions, the compositions made with aluminous cement as the setting agent reach the set stage, where no further shrinkage occurs, before evaporation of much water therefrom, whereas such is not the case with the compositions made with Portland cement as the setting agent, nor with compositions wherein alpha gypsum is the setting agent, unless the latter is employed in exceedingly large amounts (Fig. 2) such that the set and dried composition lacks the requisite degree of masticity. Consequently, compositions embodying my invention may be made up with relatively large amounts of water to provide comparatively fluid mixes as is frequently desirable for application, without substantially affecting the setting time or shrinkage of the mix.

I claim:

1. A mastic flooring composition comprising bituminous emulsion, aluminous cement as the setting agent, and mineral aggregate, the ratio of setting agent to emulsion being not substantially greater than 1:1.25 by volume, said composition having a linear shrinkage of less than 1% upon drying and setting.

2. A mastic flooring composition comprising bituminous emulsion, aluminous cement as the setting agent, and mineral aggregate, the ratio by volume of setting agent to emulsion being within the range of about 1:4 as a minimum and 1:1.25 as a maximum, said composition having the property of setting and drying with less than 1% shrinkage in linear dimensions.

3. A mastic flooring composition comprising from ½ to 1 part by volume of aluminous cement, 2 volumes of asphalt emulsion and not less than 3 volumes of mineral aggregate, said composition having a linear shrinkage of less than 1% upon drying and setting.

4. A mastic floor or like structure comprising aluminous cement as the initial setting agent, mineral aggregate, and a bitumen as the ultimate binding agent for the structure, the ratio of the setting agent to the bitumen by weight being between about 1:1.6 and 2:1.

5. A mastic floor or like structure comprising aluminous cement as the initial setting agent, mineral aggregate, and a bitumen as the ultimate binding agent for the structure, the ratio of the setting agent to the bitumen by weight being not substantially greater than 2:1.

6. A mastic flooring or the like comprising a homogeneous, coherent mixture of aluminous cement, asphalt and aggregate, the asphalt being present in quantities not less than half the weight of the cement.

7. A mastic flooring or the like comprising a homogeneous, coherent mixture of aluminous cement, asphalt and aggregate, the asphalt being present in quantities approximately equal to the weight of the cement.

8. A mastic flooring or the like comprising a homogeneous, coherent mixture of aluminous cement, asphalt and mineral aggregate, the cement being present in amounts less than twice the weight of the asphalt.

9. A mastic flooring or the like comprising a homogeneous, coherent mixture of aluminous cement, bituminous binder, and mineral aggregate.

FRANK P. JAROS.